No. 717,522. PATENTED JAN. 6, 1903.
C. O. ANDERSSON.
SAW SET.
APPLICATION FILED AUG. 11, 1902.
NO MODEL.
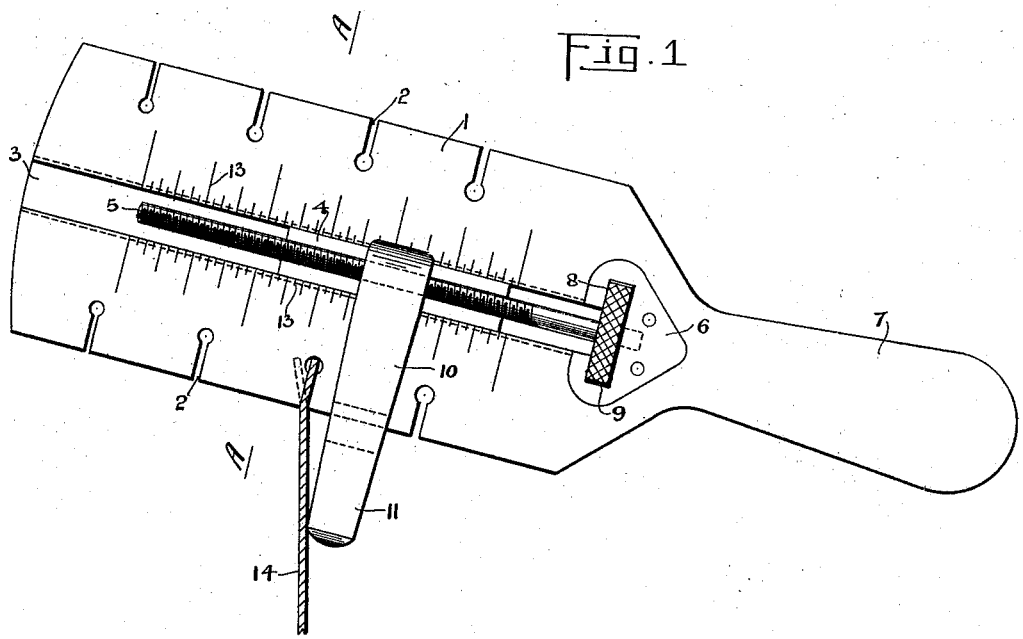
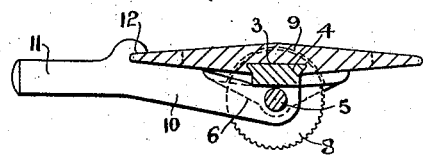

UNITED STATES PATENT OFFICE.

CARL OTTO ANDERSSON, OF WELLINGTON, NEW ZEALAND.

SAW-SET.

SPECIFICATION forming part of Letters Patent No. 717,522, dated January 6, 1903.

Application filed August 11, 1902. Serial No. 119,298. (No model.)

*To all whom it may concern:*

Be it known that I, CARL OTTO ANDERSSON, a citizen of New Zealand, residing at National Chambers, Grey street, Wellington, in the Colony of New Zealand, have invented a new and useful Improved Saw-Set, of which the following is a specification.

This invention provides improved apparatus for setting the teeth of saws, and is particularly adapted for use in connection with large crosscut and circular saws.

The invention comprises a metal plate furnished with a handle and having a plurality of slots of different width to receive saws of different gage. A longitudinal dovetailed recess in the plate receives a sliding block operated by a screw having a milled head. A projection from the block extends beyond the plate and serves as a gage in setting the teeth. The edges of the slot are marked after the manner of a rule to serve as a guide in adjusting the sliding block to suit the degree of set it is required to give to the saw.

In the drawings, Figure 1 a is side elevation; Fig. 2 a section on A A, Fig. 1.

The plate 1 has upon each side the slots 2 of different width to suit the teeth of saws of different thickness. The longitudinal recess 3 is dovetailed to receive the block 4, which slides therein and is screw-threaded to receive the screw 5, the end of which fits into a recess in a projection 6 upon the plate near the handle 7. The milled head 8 of the screw is received by a recess 9 in the plate. An arm 10, fixed upon the block 4, extends beyond the plate and has a projection 11, in which is a slot 12, receiving the edge of the plate to assist in guiding the arm. Rule-markings 13 upon each side of the plate facilitate the longitudinal adjustment of the arm in relation to the slots.

In Fig. 1 a part of a saw 14 is shown in section to illustrate the operation of the invention, which is as follows: The block 4 is adjusted by turning the screw 5 to bring the arm 10 the required distance from the slot, which is passed over the tooth of the saw. The handle 7 is then depressed to set the tooth, the amount of set being limited by the end of the arm coming in contact with the side of the saw. To set teeth upon the opposite side of the saw, the screw is turned until the block can be taken out of the recess, when it is reversed and replaced, with the arm extending beyond the opposite side of the plate.

What I claim as my invention, and desire to secure by Letters Patent, is—

1. The combination for the purpose indicated of a metal plate, a handle integral therewith the plate being slotted at its edge to receive saw-teeth, and having a longitudinal dovetailed recess, a block sliding in the recess, an arm upon the block extending beyond the plate, a projection from the arm in which is a slot receiving the edge of the plate, a screw passing through the block for operating same, means for revolving the screw and rule-markings upon the plate parallel with the slot as described.

2. The combination for the purpose indicated of a metal plate slotted at its edge to receive a tooth of a saw and having a longitudinal recess, a block sliding in the recess, carrying an arm which projects beyond the plate a screw for operating the block and means for turning the screw as described.

3. The combination for the purpose indicated of a metal plate slotted at its edge to receive a tooth of a saw and having a longitudinal dovetailed recess a block sliding in the recess, an arm upon the block having a projection in which is a recess receiving the edge of the plate, and a screw for operating the block having a milled head as described.

4. The combination for the purpose indicated of a metal plate a handle integral therewith the plate being slotted at its edge to receive a tooth of a saw and having a longitudinal recess, a block sliding in the recess, carrying an arm which projects beyond the plate, a screw passing through the block for operating said block longitudinally and a head upon the screw as described.

In witness whereof I have hereunto set my hand in presence of two witnesses.

CARL OTTO ANDERSSON.

Witnesses:
    E. J. ANSTISS,
    L. O'SULLIVAN.